(12) United States Patent
Stipe

(10) Patent No.: US 8,194,512 B2
(45) Date of Patent: Jun. 5, 2012

(54) HEAD STRUCTURE FOR THERMALLY-ASSISTED RECORDING (TAR) DISK DRIVE

(75) Inventor: Barry Cushing Stipe, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 23 days.

(21) Appl. No.: 12/942,010

(22) Filed: Nov. 8, 2010

(65) Prior Publication Data

US 2012/0113770 A1    May 10, 2012

(51) Int. Cl.
*G11B 11/00* (2006.01)

(52) U.S. Cl. .................. 369/13.33; 369/112.27

(58) Field of Classification Search ........... 369/13.33, 369/13.32, 13.24, 13.14, 13.03, 13.02, 13.12, 369/112.27, 112.09, 112.14, 112.21; 360/59, 360/313, 245.3, 126, 123.17, 125.31, 128, 360/125, 125.74, 125.02; 372/72, 69, 97, 372/92

See application file for complete search history.

(56) References Cited

U.S. PATENT DOCUMENTS

| | | | |
|---|---|---|---|
| 6,614,827 B1 | 9/2003 | Mooradian | |
| 6,778,582 B1 | 8/2004 | Mooradian | |
| 7,643,248 B2 * | 1/2010 | Sluzewski | 360/234.4 |
| 7,653,113 B2 | 1/2010 | Lee et al. | |
| 8,107,326 B1 * | 1/2012 | Hirano et al. | 369/13.33 |
| 2006/0029120 A1 | 2/2006 | Mooradian et al. | |
| 2008/0002298 A1 | 1/2008 | Sluzewski | |
| 2009/0258186 A1 | 10/2009 | Fontana, Jr. et al. | |
| 2009/0310459 A1 | 12/2009 | Gage et al. | |

FOREIGN PATENT DOCUMENTS

| | | |
|---|---|---|
| JP | 2007317259 | 12/2007 |
| JP | 2009163839 | 7/2009 |

OTHER PUBLICATIONS

Van Laere, et al., "Compact Focusing Grating Couplers for Silicon-on-Insulator Integrated Circuits", IEEE Photonics Technology Letters, vol. 19, No. 23, Dec. 1, 2007, pp. 1919-1921.
Hadley, et al., "High single-transverse-mode output from external-cavity surface-emitting laser diodes", Appl. Phys. Lett. 63 (12), Sep. 20, 1993, pp. 1607-1609.

* cited by examiner

*Primary Examiner* — Ali Neyzari
(74) *Attorney, Agent, or Firm* — Thomas R. Berthold

(57) ABSTRACT

A thermally-assisted recording (TAR) head structure has a semiconductor substrate as the head carrier with a vertical-cavity surface-emitting laser (VCSEL) on its front surface, a TAR head formed directly on the VCSEL, and a highly reflecting third mirror on its back surface. The semiconductor substrate serves as an extended cavity for the VCSEL. The TAR head is fabricated on the outer surface of the VCSEL in the same manner as proposed for fabrication of a TAR head on a conventional slider. The TAR head includes a conventional read head and write head, and an optical waveguide with a grating coupler and a near-field transducer (NFT). The laser radiation is output through a partially reflecting output mirror of the VCSEL through the front surface to the grating coupler, which turns the incoming laser radiation 90 degrees and directs it into the waveguide from where it is directed to the NFT.

13 Claims, 5 Drawing Sheets

HEAD STRUCTURE FOR THERMALLY-ASSISTED RECORDING (TAR) DISK DRIVE

TECHNICAL FIELD

This invention relates generally to a thermally-assisted recording (TAR) disk drive, in which data are written while the magnetic recording layer on the disk is at an elevated temperature, and more specifically to a TAR head structure that includes a laser, an optical waveguide, the magnetic write head and the magnetoresistive read head integrated with the head carrier.

BACKGROUND OF THE INVENTION

Thermally-assisted recording (TAR), also called heat-assisted magnetic recording (HAMR), has been proposed. In a TAR disk drive, an optical waveguide with a near-field transducer (NFT) directs radiation from a laser to heat localized regions of the magnetic recording layer on the disk. The radiation heats the magnetic material locally to near or above its Curie temperature to lower the coercivity enough for writing to occur by the magnetic field from the write head. The recorded data is read back by a conventional magnetoresistive read head. The optical waveguide, write head and read head are formed on the trailing surface of a head carrier, such as a slider with an air-bearing surface (ABS) that allows the slider to ride on a thin film of air above the surface of the rotating disk.

One of the challenges for TAR is the integration of the laser with the head carrier so that the laser light is directed to the optical waveguide. A vertical-cavity surface-emitting laser (VCSEL) has been proposed because of its high reliability and low cost. TAR sliders with various means for attachment of a VCSEL are described in US 20080002298 A1 and US 20090310459 A1. However, a typical VCSEL does not have adequate power output for currently proposed TAR disk drives.

An extended cavity VCSEL has been proposed where a third mirror is on the back side of the VCSEL semiconductor substrate. The thickness of the semiconductor substrate forms an extended cavity for the VCSEL, which allows for higher single mode power than can be achieved with a typical VCSEL without the external cavity and third mirror. An extended cavity VCSEL is described in U.S. Pat. No. 6,778,582 B1.

What is needed is a TAR head structure with an extended cavity VCSEL integrated with the head carrier.

SUMMARY OF THE INVENTION

The invention relates to a TAR head structure wherein the head carrier comprises an extended cavity VCSEL and the TAR head is fabricated on the outer surface of the VCSEL. The head carrier is a semiconductor substrate with front and back surfaces and a surface substantially orthogonal to the front and back surfaces that function as the ABS. A VCSEL is formed on the semiconductor substrate front surface, and a highly reflecting third mirror is formed on the semiconductor substrate back surface so that semiconductor substrate serves as the extended cavity. The laser radiation is output through a partially reflecting output mirror through the front surface. The TAR head is fabricated on the outer surface of the VCSEL in the same manner as proposed for fabrication of a TAR head on a conventional slider. The TAR head has an ABS that is substantially coplanar with the ABS of the semiconductor substrate. The TAR head includes a conventional magnetoresistive read head, a write head with write pole and electrically conductive coil, an optical waveguide with a grating coupler and a NFT located at the ABS, and conventional insulating layers, typically alumina, surrounding and electrically isolating the various TAR head elements. During fabrication of the TAR head directly on the VCSEL, vias are formed in the insulating layers to bring electrical connection to the VCSEL from pads on an outer surface of the TAR head, in the same manner that electrical connection is made to the read head and coil of the write head. The laser radiation from the extended cavity VCSEL is output through the radiation-transmissive insulating layers of the TAR head to the grating coupler, which turns the incoming laser radiation 90 degrees and directs it into the waveguide from where it is directed to the NFT at the ABS.

For a fuller understanding of the nature and advantages of the present invention, reference should be made to the following detailed description taken together with the accompanying figures.

DETAILED DESCRIPTION OF THE INVENTION

Figure 1:
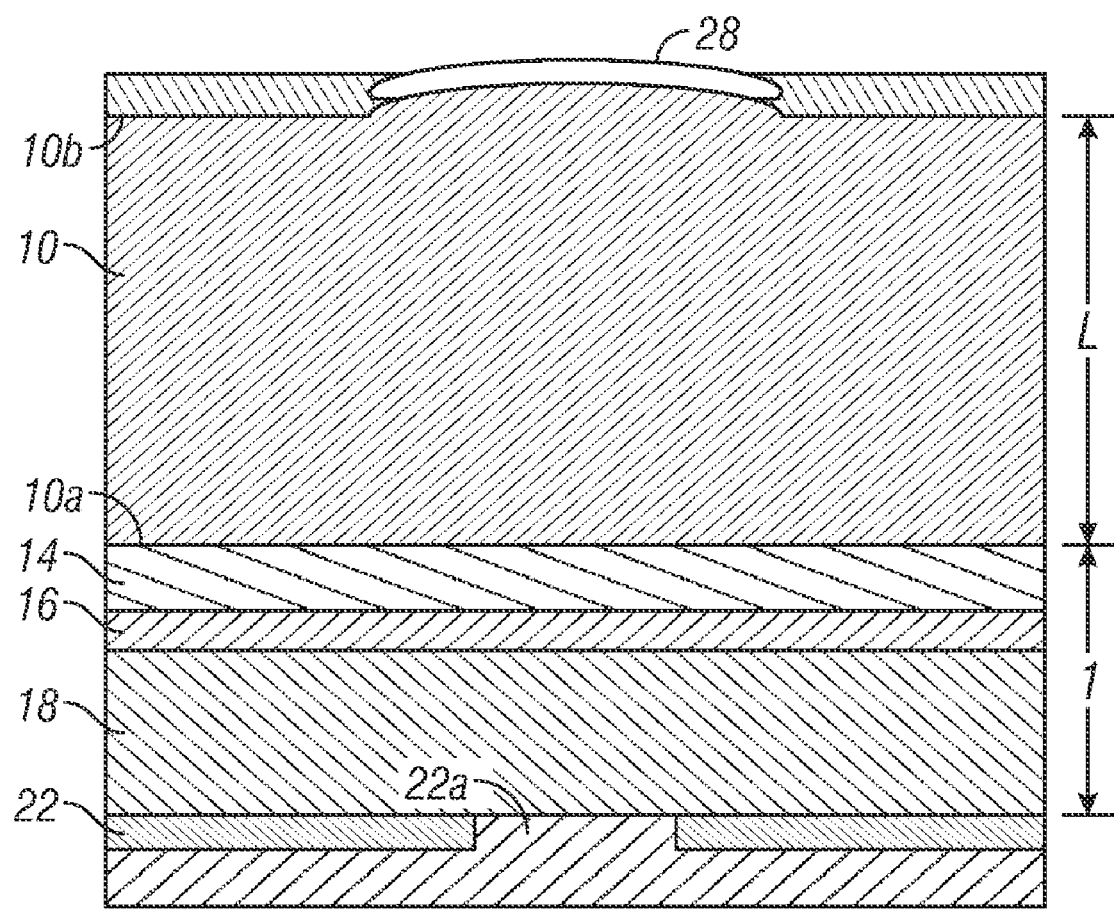
FIG. 1 is sectional view of a prior art extended cavity vertical cavity surface emitting laser (VCSEL).

FIG. 1 is a sectional view of a monolithic extended cavity VCSEL according to the prior art and as described in U.S. Pat. No. 6,778,582 B1. The extended cavity VCSEL has a semiconductor substrate 10 with front surface 10a, back surface 10b and thickness L. A VCSEL with active region 1 is formed on front surface 10a and includes gain layer 16 located between partially reflecting intermediate Bragg reflector or mirror 14 and bottom Bragg mirror 18, and an oxide layer 22 that defines an aperture 22a. A partially reflecting output mirror 28 is formed on the back surface 10b of semiconductor substrate 10 and functions as a third mirror. The laser radiation is emitted through the third mirror 28. The semiconductor substrate 10 with thickness L functions as an extended cavity for the VCSEL. The extended cavity allows for higher single mode power than can be achieved with a typical VCSEL without the extended cavity and third mirror. When the extended cavity is made from GaAs, the extended cavity VCSEL may be designed to generate laser radiation with a wavelength of greater than approximately 920 nm. For example, the wavelength may be between 920 nm and 1000 nm. Shorter wavelengths require the use of a different substrate due to optical losses in the in GaAs. The extended cavity VCSEL shown in FIG. 1 is a single device that has been cut from a semiconductor wafer onto which the materials making up the various layers have been deposited and patterned using well-known semiconductor lithographic and fabrication processes. Thus a large number of devices are formed on a single wafer. The materials, dimensions and fabrication methods for the extended cavity VCSEL shown in FIG. 1 are described in detail in U.S. Pat. No. 6,778,582 B1.

Figure 2:
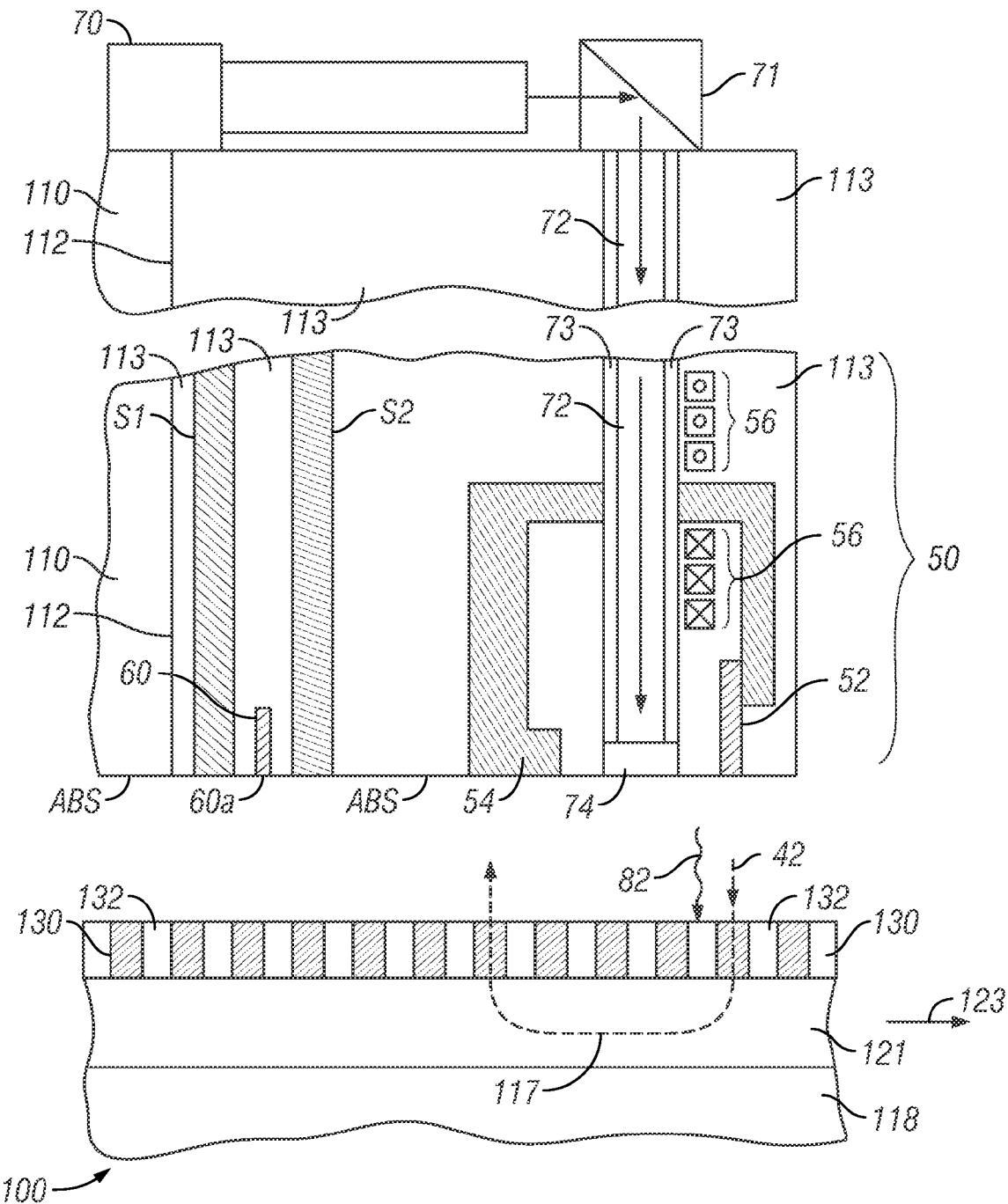
FIG. 2 is a sectional view through a portion of a disk and an air-bearing slider that supports a thermally-assisted recording (TAR) head according to the prior art.

FIG. 2 is a sectional view through a portion of a TAR disk 100 and air-bearing slider 110 that functions as the head carrier to support the TAR head, as proposed in the prior art. FIG. 2 is not drawn to scale because of the difficulty in showing the very small features. The TAR disk 100 is depicted as a patterned-media disk with a disk substrate 118 and discrete magnetic islands 130 and nonmagnetic regions 132. The islands 130 are spaced apart by nonmagnetic regions 132, which may formed of polymeric material for planarizing disk 100. The islands 130 are magnetized perpendicularly, resulting in the recorded bits being stored in the recording layer of the islands 130 in a generally perpendicular or out-of-plane orientation. The islands 130 are discrete magnetic islands that function as the patterned bits. A heat sink layer 121 may located below the islands 130 and nonmagnetic regions 132. The TAR disk 100 may also be a conventional continuous-media magnetic recording disk wherein the recording layer is not patterned but is a continuous layer.

Also shown on slider 110 with disk-facing surface or air-bearing surface (ABS) is the read head 60 and the write head 50 (with the yoke that connects write pole 52 and a return pole 54). The ABS of slider 110 is the surface that faces the disk 100 and is shown without the thin protective overcoat typically present in an actual slider. The ABS shall mean the surface of the head carrier that is covered with a thin protective overcoat, the actual outer surface of the head carrier if there is no overcoat, or the outer surface of the overcoat. Write current passes through a coil 56 of the write head 50 to generate a magnetic field (arrow 42) at the write pole 52. This magnetic field magnetizes the recording layer on the island 130 beneath the write pole 52 as the disk 100 moves past the write head 50 in the direction of arrow 123. The detection or reading of the recorded bits is by a read head 60 having a sensing edge 60a at the ABS. The read head is typically a magnetoresistive (MR) read head, such as a tunneling MR (TMR) read head in which a sense current passes perpendicularly through the layers making up the head. A pair of magnetic permeable shields S1 and S2 are located on opposite sides of read head 60 to prevent magnetic flux from bits other than the bit being read from reaching the read head 60. The write coil 56 is shown as a conventional flat or "pancake" coil wrapped around the yoke that connects the write pole 52 with the return pole 54, with the electrical current directions being shown as into the paper by the coil cross-sections marked with an "X" and out of the paper by the coil cross-sections marked with a solid circle. However, the coil may also be a conventional helical coil wrapped around the portion of the yoke that directly supports the write pole 52. The TAR head has an outer surface 115 with electrically conductive pads (not shown) that connect through the insulating layers 113 to the read head 60 and coil 56 of write head 50.

The slider 110 also supports a laser 70, mirror 71, optical channel or waveguide 72 and near-field transducer (NFT) 74, which has its output at the ABS. The optical waveguide 72 is depicted in FIG. 2 as extending through the yoke of write head 50 and being located between the write pole 52 and return pole 54. However the optical waveguide 72 may be located at other locations, such as between shield S2 and return pole 54, or between the write pole 52 and the outer face of the slider 110. The waveguide 72 is formed of a core material such as Ta$_2$O$_5$ or another high index dielectric material that is transmissive to radiation at the wavelength of the laser and is surrounded by a dielectric cladding layer 73 (for example SiO$_2$ or Al$_2$O$_3$) of lower refractive index than the core material. While the slider 110 in FIG. 2 is depicted as supporting mirror 71 for directing the laser radiation from laser 70 into waveguide 72, it is known to use a grating coupler coupled to the waveguide, as described for example in US 20090310459 A1.

The NFT 74 is located at the output of waveguide 72 at the ABS of the slider 110. The laser radiation strikes the NFT 74, creating concentrated near-field radiation to the islands 130 as the disk rotates in the direction 123 past the slider 110. A "near-field" transducer, as used herein, refers to "near-field optics", wherein the passage of light is to, from, through, or near an element with subwavelength features and the light is coupled to a second element located a subwavelength distance from the first. NFTs typically use a low-loss metal (e.g., Au, Ag, Al or Cu) shaped in such a way to concentrate surface charge motion at a surface feature shaped as a primary apex or tip. Oscillating tip charge creates an intense near-field pattern. Sometimes, the metal structure can create resonant charge motion, called surface plasmons or local plasmons, to further increase intensity. The electromagnetic field of the oscillating tip charge then gives rise to optical output in the near field, which is directed to the data islands on the disk. The NFT 74 has features less than the wavelength of the laser radiation and the spacing between the NFT 74 and the islands is less than the wavelength of the laser radiation.

When write-current is directed through coil 56, the write pole 52 directs magnetic flux to the data islands 130. The dashed line 117 with arrows shows the flux return path back to the return pole 54. The NFT 74 directs near-field radiation, as represented by wavy arrow 82, to the data islands 130 as the TAR disk 100 moves in the direction 123 relative to the slider 110. The electric charge oscillations in the NFT 74 heat the data islands 130. This raises the temperature of the magnetic recording material in a data island to near or above its Curie temperature to thereby lower the coercivity of the material and enable the magnetization of the data island to be switched by the write field from the write pole 52.

The read head 60, shields S1, S2, return pole 54, write pole 52, coil 56 and waveguide 72 are fabricated on the trailing surface 112 of slider 110 using well-known conventional thin film deposition and patterning techniques. Insulating material, typically alumina, is deposited at various times during the fabrication process to separate the various TAR head elements and refill recessed areas, as shown by insulating layers 113. The insulating material generally surrounds the TAR head elements and provides a portion of the ABS. The slider 110 is typically formed of an alumina/titanium-carbide (Al$_2$O$_3$/TiC) composite material. The trailing surface 112 is the surface of a wafer onto which a large number of TAR heads are patterned. The wafer is then diced into individual sliders with the length of the sliders (in the direction perpendicular to trailing surface 112) corresponding generally to the thickness of the wafer. US 20090258186 A1, assigned to the same assignee as this application, describes a wafer-level process for fabricating TAR heads with thin film waveguides and NFTs.

The invention relates to a TAR head structure wherein the head carrier comprises an extended cavity VCSEL and the TAR head is fabricated on the outer surface of the VCSEL. An embodiment of the invention is shown in the sectional view of FIG. 3, which is not to scale. The head carrier is semiconductor substrate 210 with front surface 210a and back surface 210b and thickness L1. The substrate has an ABS substantially orthogonal to front and back surfaces 210a, 210b. A VCSEL is formed on front surface 210a and has an outer surface 218a. The VCSEL includes gain layer 216 located between partially reflecting intermediate Bragg reflector or mirror 214 and output Bragg mirror 218. The oxide layer 222 that defines an aperture 222a may be between the intermediate mirror 214 and output Bragg mirror 218 on either side of the gain layer 216, or may be on top of the output mirror 218. The head carrier is similar to the prior art extended cavity VCSEL of FIG. 1 except that the third mirror, i.e., reflector or mirror 228 on back surface 210b, is highly reflective and output mirror 218 is less reflective than mirror 218 (FIG. 1), which results in the laser radiation being output through output mirror 218. Also, an annular isolation trench 223 separates mirror 218 from region 210c, which may be formed of the same material as substrate 210. The isolation trench 223 forces current to flow through the aperture 222a. An electrode layer 224a is patterned on outer surface 218a to provide electrical contact with region 210c. An electrode layer 224b is patterned on mirror 218 to provide electrical contact with mirror 218. The electrodes 224a, 224b allow electrical current to flow through the aperture 222a. The semiconductor substrate 210 with thickness L1 functions as an extended cavity for the VCSEL. The semiconductor substrate may be formed of GaAs or AlGaAs, with L1 in the range of about 500 to 1500 μm. The high reflectivity third mirror or reflector 228 may be formed of metal or a distributed Bragg reflector (DBR) may be used. The mirror 228 may have a reflectivity of about 99% to 99.9% and may cover either a limited area or the entire area of the slider leading edge. The intermediate Bragg mirror 214 may have a reflectivity of about 50 to 90%. The output Bragg mirror 218 may have a reflectivity of about 50 to 90% and has an outer surface 218a which is the outer surface of the VCSEL.

The TAR head is similar to the TAR head in the prior art of FIG. 2 but is fabricated on outer surface 218a of the VCSEL over the electrodes 224a, 224b, rather than on the trailing surface 112 of conventional slider 110 (FIG. 2). The TAR head includes insulating layers 113, typically alumina, that generally surround the TAR head elements and provide a portion of the ABS. An optional seed layer or protective layer may be deposited on the outer surface 218a prior to the fabrication of the TAR head. During fabrication of the TAR head, vias (not shown) are formed in the insulating layers 113 to bring electrical connection of electrodes 224a, 224b out to connection pads 114a, 114b, respectively on outer surface 115, in the same manner that electrical connection is made to the read head 60 and coil 56 of write head 50.

Figure 3:
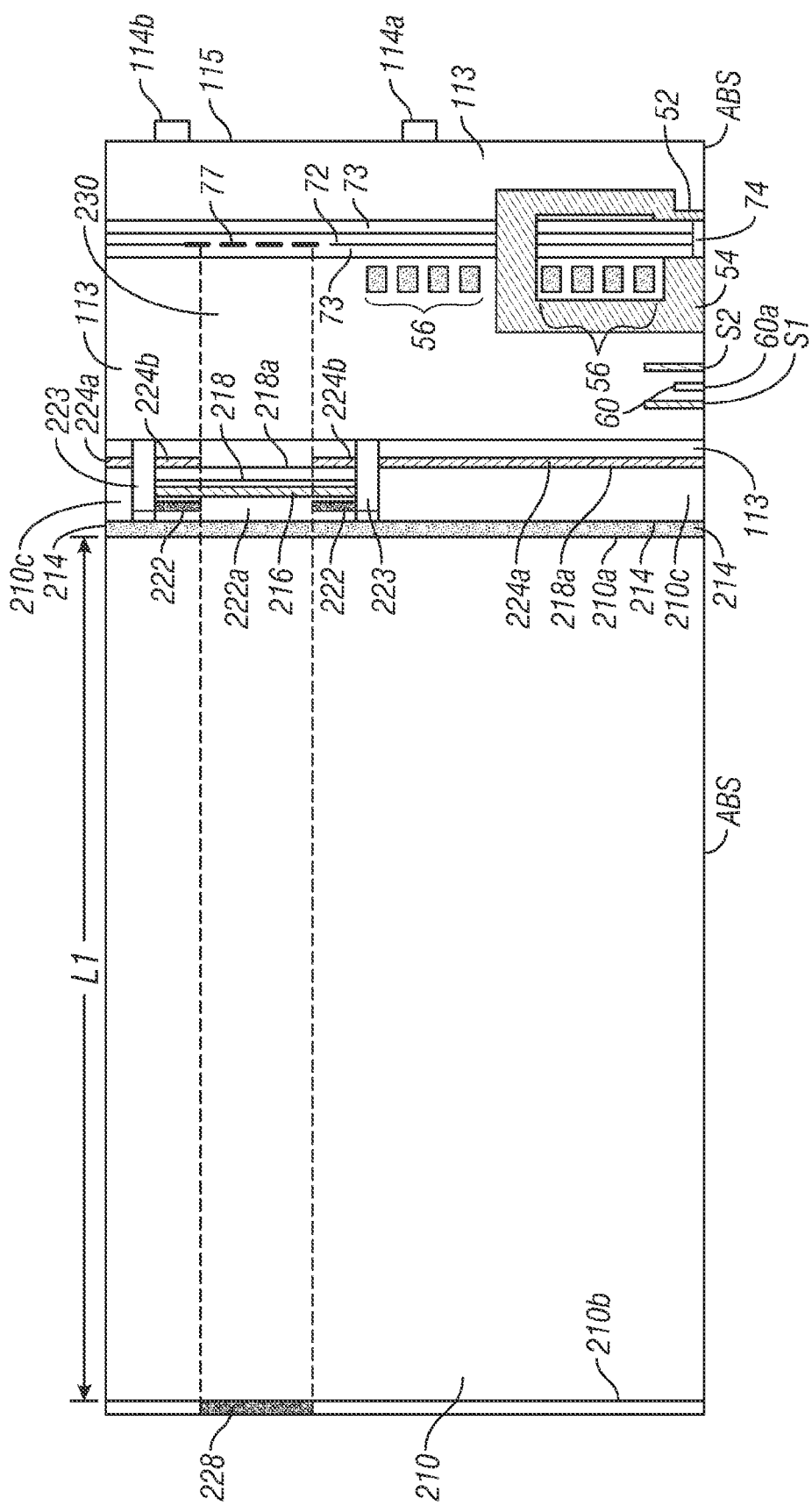
FIG. 3 is a sectional view of the TAR head structure according to the invention and shows a sectional view of a portion of a perpendicular magnetic recording disk maintained near the disk-facing surface of the head structure.
Figure 4:
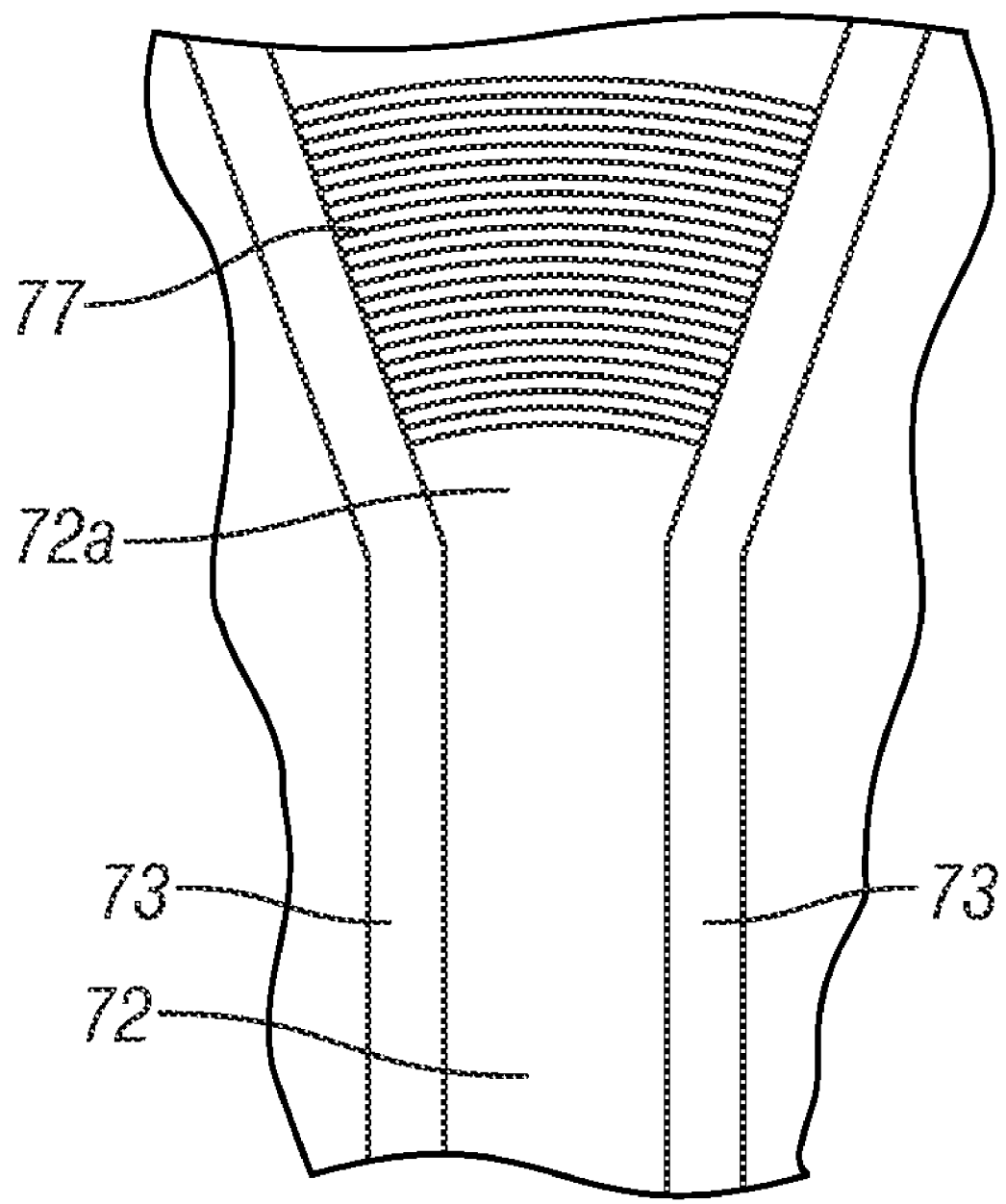
FIG. 4 is a view of the grating coupler and waveguide portion of the TAR head structure according to the invention as viewed from a direction orthogonal to the outer surface of the VCSEL.

As shown in FIG. 3 the TAR head has an ABS that is substantially coplanar with the ABS of semiconductor substrate 210. An additional difference from the TAR head of FIG. 2 is grating coupler 77 that is coupled to waveguide 72 and is oriented generally parallel to outer surface 218a and orthogonal to radiation beam 230. The laser radiation beam 230 passes from output mirror 218 through the insulating material 113, which is transparent to the laser radiation at the wavelength, typically 920 to 1000 nm, to grating coupler 77. The grating coupler 77 turns the incoming laser radiation 90 degrees and directs it into waveguide 72. FIG. 4 is a view of grating coupler 77 and the tapered input end 72a of waveguide 72 as viewed from a direction orthogonal to outer surface 218a. The grating coupler 77 is coupled to the tapered end 72a of waveguide 72. Waveguide 72 is located between cladding layers 73. Grating couplers are well-known and have been proposed for use in TAR heads, as described for example in US 20090310459 A1. Focusing grating couplers and grating couplers coupled to tapered waveguides are described by Van Laere, et al., "Compact Focusing Grating Couplers for Silicon-on-Insulator Integrated Circuits", *IEEE PHOTONICS TECHNOLOGY LETTERS*, VOL. 19, NO. 23, DECEMBER 1, 2007, pp. 1919-1921.

Figure 5:
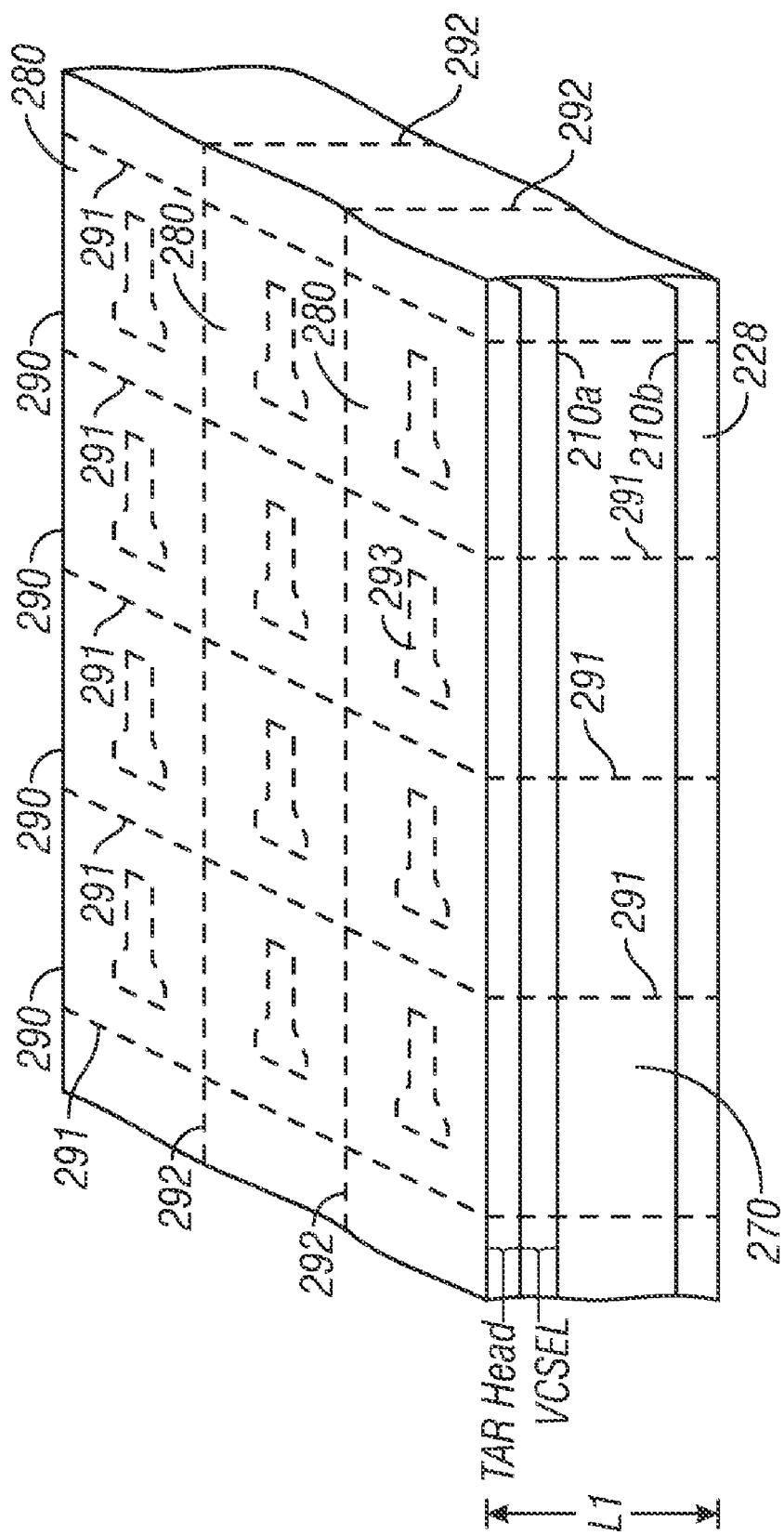
FIG. 5 is a perspective view of a portion of a semiconductor wafer with generally rectangular regions, each region having a patterned VCSEL and TAR head, prior to cutting of the wafer into the individual TAR head structures according to the invention.

The front surface 210a is the surface of a semiconductor wafer onto which a large number of VCSE1s and TAR heads are patterned. The wafer is then diced into individual TAR head structures. FIG. 5 is a perspective view of a portion of a semiconductor wafer 270. The wafer 270 has a generally planar front surface 210a and back surface 210b. The materials for forming the VCSELs are deposited and patterned on the front surface 210a, and the materials for forming the TAR heads are deposited on the VCSELs. The material for third mirror 228 is deposited on the back surface 210b. The VCSELs and TAR heads are patterned on a plurality of generally rectangular regions 280 that are arranged in generally parallel rows 290, with each region 280 being shown bounded by dashed lines 291, 292. Each region 280 is shown with an outline 293 that represents the write head, which is typically the last portion of the TAR head fabricated on the wafer. After all the processing steps for forming the VCSELs and TAR heads, the wafer 270 is cut into rows 290 along planes represented by dashed lines 291, and the rows 290 then cut along planes represented by dashed lines 292, to form the individual TAR head structures. The structures are lapped, either at the row level or the individual slider level, along planes parallel to planes represented by dashed lines 291, to define the ABS.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A thermally-assisted recording (TAR) head structure for a magnetic recording disk drive comprising:
   a semiconductor substrate having a back surface and a front surface generally parallel to said back surface;
   a vertical cavity surface emitting laser (VCSEL) on said front surface, the VCSEL having a laser radiation output surface generally parallel to said front surface, the laser radiation being output in a direction substantially perpendicular to said output surface;
   a back mirror on said back surface, the semiconductor substrate between the back mirror and the VCSEL forming an extended cavity for the VCSEL;
   a TAR head formed on and in contact with the VCSEL output surface, the TAR head comprising:
      a layer of electrically insulating material, the insulating layer having a disk-facing surface generally orthogonal to said back and front semiconductor substrate surfaces;
      an optical waveguide oriented generally parallel to said output surface, the waveguide having a grating coupler for directing laser radiation from the output surface to the waveguide;
      a near-field transducer (NFT) coupled to the waveguide and located at the disk-facing surface for receipt of laser radiation from the waveguide;
      a write head having a write pole at the disk-facing surface; and
      a magnetoresistive read head having a sensing edge at the disk-facing surface.

2. The head structure of claim 1 wherein the semiconductor substrate has a disk-facing surface substantially coplanar with the disk-facing surface of said insulating layer.

3. The head structure of claim 1 wherein the semiconductor substrate comprises a material selected from GaAs and AlGaAs.

4. The head structure of claim 1 wherein the VCSEL comprises a partially-reflecting output mirror, a partially-reflecting intermediate mirror between said back mirror and the output mirror, and an oxide layer having an aperture therein and located between the intermediate mirror and the output mirror.

5. The head structure of claim 4 further comprising a first electrode for providing electrical connection to the substrate and a second electrode for providing electrical connection to the output mirror.

6. The head structure of claim 1 wherein the TAR head further comprises two shield layers of magnetically permeable material and wherein the read head is located between the two shield layers.

7. The head structure of claim 1 wherein the write head further comprises a return pole magnetically coupled to the write pole.

8. The head structure of claim 1 wherein the write head further comprises an electrically conductive coil for generating magnetic flux in the write pole when electrical current is passed through the coil.

9. The head structure of claim 1 wherein the coil is a helical coil wrapped around the write pole.

10. The head structure of claim 1 wherein the coil is a flat coil.

11. The head structure of claim 1 wherein the substantially coplanar disk-facing surfaces of the semiconductor substrate and insulating layer are an air-bearing surface.

12. A thermally-assisted perpendicular magnetic recording disk drive comprising:
- a perpendicular magnetic recording disk comprising a disk substrate and a perpendicular magnetic recording layer on the disk substrate; and
- the head structure of claim 1; wherein the head structure is maintained near the disk with the spacing between the NFT and the recording layer being less than the wavelength of the laser radiation.

13. The disk drive of claim 12 wherein the perpendicular magnetic recording layer is patterned into discrete data islands.

* * * * *